(12) United States Patent
Fasching et al.

(10) Patent No.: US 9,698,410 B2
(45) Date of Patent: Jul. 4, 2017

(54) COMPOSITE STRUCTURES CONTAINING HIGH CAPACITY POROUS ACTIVE MATERIALS CONSTRAINED IN SHELLS

(71) Applicant: Amprius, Inc., Sunnyvale, CA (US)

(72) Inventors: Rainer J. Fasching, Mill Valley, CA (US); Zuqin Liu, Sunnyvale, CA (US); Song Han, Foster City, CA (US); Ghyrn E. Loveness, Mountain View, CA (US); Constantin I. Stefan, San Jose, CA (US)

(73) Assignee: Amprius, Inc., Sunnyvale, CA (US)

( * ) Notice: Subject to any disclaimer, the term of this patent is extended or adjusted under 35 U.S.C. 154(b) by 0 days.

(21) Appl. No.: 14/928,576

(22) Filed: Oct. 30, 2015

(65) Prior Publication Data

US 2016/0064725 A1   Mar. 3, 2016

Related U.S. Application Data

(62) Division of application No. 13/277,620, filed on Oct. 20, 2011, now Pat. No. 9,209,456.
(Continued)

(51) Int. Cl.
*H01M 4/04* (2006.01)
*H01M 4/133* (2010.01)
(Continued)

(52) U.S. Cl.
CPC ......... *H01M 4/0404* (2013.01); *H01M 4/049* (2013.01); *H01M 4/0428* (2013.01);
(Continued)

(58) Field of Classification Search
CPC ............................ H01M 4/386; H01M 4/5825
See application file for complete search history.

(56) References Cited

U.S. PATENT DOCUMENTS 5,426,006 A    6/1995   Delnick et al.
5,702,845 A   12/1997   Kawakami et al.
(Continued)

FOREIGN PATENT DOCUMENTS

CN        1891668 A     1/2004
CN      101346836 A     1/2009
(Continued)

OTHER PUBLICATIONS

Nishi, Yoshio, "Lithium ion secondary batteries; past 10 years and the future," *Journal of Power Sources*, vol. 100, 2001, pp. 101-106.
(Continued)

*Primary Examiner* — Scott J Chmielecki
(74) *Attorney, Agent, or Firm* — Weaver Austin Villeneuve & Sampson LLP

(57) ABSTRACT

Provided are novel electrode material composite structures containing high capacity active materials formed into porous base structures. The structures also include shells that encapsulate these porous base structures. During lithiation of the active material, the shell mechanically constrains the porous base structure. The shell allows lithium ions to pass through but prevents electrolyte solvents from interacting with the encapsulated active material. In certain embodiments, the shell contains carbon, while the porous base structure contains silicon. Although silicon tends to swell during lithiation, the porosity of the base structure and/or void spaces inside the shell helps to accommodate this additional volume within the shell without breaking it or substantially increasing the overall size of the composite structure. This allows integration of the composite structures into various types of battery electrodes and cycling high capacity active materials without damaging the electrodes' internal structures and deteriorating cycling characteristics of batteries.

10 Claims, 10 Drawing Sheets

Related U.S. Application Data

(60) Provisional application No. 61/406,049, filed on Oct. 22, 2010.

(51) Int. Cl.

| | | |
|---|---|---|
| *H01M 4/134* | (2010.01) | |
| *H01M 4/1393* | (2010.01) | |
| *H01M 4/1395* | (2010.01) | |
| *H01M 4/36* | (2006.01) | |
| *H01M 4/62* | (2006.01) | |
| *H01M 10/052* | (2010.01) | |
| *H01M 4/38* | (2006.01) | |
| *H01M 4/58* | (2010.01) | |
| *H01M 10/0525* | (2010.01) | |
| *H01M 4/02* | (2006.01) | |
| *H01M 10/52* | (2006.01) | |

(52) U.S. Cl.
CPC ......... *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/366* (2013.01); *H01M 4/386* (2013.01); *H01M 4/387* (2013.01); *H01M 4/58* (2013.01); *H01M 4/625* (2013.01); *H01M 10/052* (2013.01); *H01M 10/0525* (2013.01); *H01M 10/52* (2013.01); *H01M 2004/021* (2013.01); *H01M 2004/027* (2013.01); *H01M 2220/30* (2013.01); *Y02E 60/122* (2013.01)

(56) References Cited

U.S. PATENT DOCUMENTS

| | | | |
|---|---|---|---|
| 5,855,860 A * | 1/1999 | Nishimine | C01B 33/18 423/336 |
| 6,025,094 A * | 2/2000 | Visco | H01M 4/04 427/126.2 |
| 6,238,821 B1 | 5/2001 | Mukherjee et al. | |
| 7,438,759 B2 | 10/2008 | Zhang et al. | |
| 8,206,569 B2 | 6/2012 | Lopatin et al. | |
| 8,367,240 B2 | 2/2013 | Honda | |
| 8,420,258 B2 | 4/2013 | Rojeski | |
| 8,481,214 B2 | 7/2013 | Rojeski | |
| 8,652,683 B2 | 2/2014 | Rojeski | |
| 8,900,748 B2 | 12/2014 | Cho | |
| 2004/0126653 A1 | 7/2004 | Visco et al. | |
| 2004/0197641 A1 * | 10/2004 | Visco | H01M 6/04 429/137 |
| 2007/0117007 A1 * | 5/2007 | Visco | H01M 2/1646 429/144 |
| 2008/0038638 A1 | 2/2008 | Zhang et al. | |
| 2008/0057399 A1 * | 3/2008 | Visco | C03C 4/18 429/246 |
| 2008/0161746 A1 | 7/2008 | Visco et al. | |
| 2008/0206641 A1 * | 8/2008 | Christensen | H01M 4/0435 429/218.1 |
| 2009/0029256 A1 | 1/2009 | Mah | |
| 2009/0117472 A1 | 5/2009 | Iwamoto | |
| 2009/0162746 A1 | 6/2009 | Honda | |
| 2009/0169996 A1 | 7/2009 | Zhamu et al. | |
| 2009/0186267 A1 | 7/2009 | Tiegs | |
| 2009/0202908 A1 * | 8/2009 | Sumihara | H01M 4/13 429/218.1 |
| 2009/0202915 A1 * | 8/2009 | Modeki | H01M 4/134 429/246 |
| 2009/0214944 A1 | 8/2009 | Rojeski | |
| 2009/0311605 A1 * | 12/2009 | Visco | H01M 2/1673 429/231.95 |
| 2010/0119948 A1 | 5/2010 | Hasegawa et al. | |
| 2010/0176337 A1 | 7/2010 | Zhamu et al. | |
| 2010/0291441 A1 | 11/2010 | Ugaji et al. | |
| 2011/0008233 A1 * | 1/2011 | Miyanaga | C01B 25/45 423/306 |
| 2011/0135925 A1 * | 6/2011 | Zhamu | C01B 31/04 428/367 |
| 2011/0159365 A1 | 6/2011 | Loveness et al. | |
| 2011/0189510 A1 | 8/2011 | Caracciolo et al. | |
| 2011/0229761 A1 | 9/2011 | Cui et al. | |
| 2012/0034524 A1 | 2/2012 | Caracciolo et al. | |
| 2012/0070741 A1 | 3/2012 | Liu et al. | |
| 2012/0094192 A1 | 4/2012 | Jun et al. | |
| 2012/0183856 A1 | 7/2012 | Cui et al. | |
| 2013/0011736 A1 | 1/2013 | Loveness et al. | |
| 2013/0069601 A1 | 3/2013 | Coowar et al. | |
| 2013/0078523 A1 | 3/2013 | Rojeski | |
| 2013/0143124 A1 | 6/2013 | Lee et al. | |
| 2013/0344383 A1 | 12/2013 | Loveness et al. | |
| 2015/0325852 A1 | 11/2015 | Wang et al. | |

FOREIGN PATENT DOCUMENTS

| | | |
|---|---|---|
| CN | 101356666 A | 1/2009 |
| CN | 101356670 A | 1/2009 |
| CN | 101527357 | 9/2009 |
| CN | 101689628 A | 3/2010 |
| CN | 101453016 | 6/2010 |
| CN | 101356666 B | 10/2010 |
| CN | 101953014 A | 1/2011 |
| CN | 101689628 B | 6/2012 |
| CN | 102959775 A | 3/2013 |
| EP | 883199 | 12/1998 |
| EP | 1 205 989 | 5/2002 |
| EP | 1 873 846 | 1/2008 |
| EP | 2 219 250 | 8/2010 |
| JP | 2000-036323 | 2/2000 |
| JP | 2002-216751 | 8/2002 |
| JP | 2003-303588 | 10/2003 |
| JP | 2005-259697 | 9/2005 |
| JP | 2005-310759 | 11/2005 |
| JP | 2008/235258 | 10/2008 |
| JP | 2009-032693 | 2/2009 |
| JP | 2009-164137 | 7/2009 |
| JP | 2010-262752 | 11/2010 |
| JP | 2005-071655 | 3/2016 |
| KR | 2006-0047424 | 5/2006 |
| KR | 2010 0113433 | 10/2010 |
| WO | 2008/044449 | 4/2008 |
| WO | 2010/100599 | 9/2010 |
| WO | 2010/129910 | 11/2010 |
| WO | 2011/053736 | 5/2011 |
| WO | 2015/175509 | 11/2015 |

OTHER PUBLICATIONS

TW Office Action issued on Nov. 13, 2015, in Application No. 100138361.

Second Chinese Office Action issued in Application No. 201180057806.9, dated Nov. 19, 2015.

Baldwin, Richard K., et al. "Solution reduction synthesis of surface stabilized silicon nanoparticles," The Royal Society of Chemistry 2002, *Chem. Commun.*, 2002, 1822-1823.

Aifantis et al., "High energy density lithium batteries", 2010 WILEY-VCH Verlag GmbH & Co. KGaA, Weinheim (Chapter 6: Next-generation anodes for secondary Li-Ion batteries).

Kasavajjula et al., "Nano- and bulk-silicon-based insertion anodes for lithium-ion secondary cells", Journal of Power Sources 163 (2007) 1003-1039.

Song et al., "Arrays of sealed silicon nanotubes as anodes for lithium ion batteries," Nano Letters, American Chemical Society, Jan. 11, 2010.

Hertzberg et al., "Deformations in Si-Li anodes upon electrochemical alloying in nano-confined space," J. Am. Chem. Soc. 2010, 132, 8548-8549, Apr. 15, 2010.

Softpedia, "Silicon can improve lithium-ion batteries," downloaded from http://news.softpedia.com/news/silicon-can-improve-lithium-ion-batteries-161142.shtml on Oct. 21, 2010.

U.S. Appl. No. 13/427,681, Office Action mailed Jun. 11, 2013.

(56) References Cited

OTHER PUBLICATIONS

Marczak et al., "The individual core/shell silicon nanowire structure probed by Raman spectroscopy," Phys. Status Solidi C 6, No. 9, 2053-2055 (2009).
Chinese Office Action issued in Application No. 201180057806.9, dated Mar. 30, 2015.
Kim, et al., "Three-Dimensional Porous Silicon Particles for Use in High Performance Lithium Secondary Batteries," Angew, Chem, Int. Ed, vol. 47, pp. 10151-10154. Published 2008.
International Search Report and Written Opinion mailed Jun. 28, 2012, issued in Application No. PCT/US2011/057158.
Magasinski et al., "Towards efficent binders for Li-ion battery Si-based anodes," Abstract #64, IMLB 2010, The Electrochemical Society.
Magasinski et al., "Hierarchical botton-up approach for high-performance Si-based Li-ion battery anodes," Abstract #16, IMLB 2010, The Electrochemical Society.
Hertzberg et al., "Abstract SiC nanotubes Cu foil," J. Am. Chem. Soc., 2010, 8548-8549.
Jie Xiao, et al., "Stabilization of silicon anode for Li-ion batteries," Journal of the Electrochemical Society, 157 (10) A1047-A1051, Aug. 2, 2010.
Office Action issued on Dec. 7, 2012 in U.S. Appl. No. 13/277,620.
Office Action issued on Aug. 29, 2013 in U.S. Appl. No. 13/277,620.
Final Office Action issued on Mar. 28, 2014 in U.S. Appl. No. 13/277,620.
Notice of Allowance issued on Jul. 31, 2015 in U.S. Appl. No. 13/277,620.
JP Notice of Reasons for Rejection issued on Sep. 8, 2015, in Application No. 2013-535103.
Office Action issued on Nov. 4, 2014 in U.S. Appl. No. 13/277,620.
International Search report and Written Opinion dated Aug. 10, 2015, issued in Application No. PCT/US15/30336.
JP Notice of Reasons for Rejection issued on Sep. 6, 2016, in Application No. 2013-535103.
EP Extended Search Report dated Nov. 19, 2015, issued in Application No. 11835170.9.
KR Notice of Reasons for Rejection issued on Feb. 27, 2017 in Application No. 10-2013-7012809.

\* cited by examiner

COMPOSITE STRUCTURES CONTAINING HIGH CAPACITY POROUS ACTIVE MATERIALS CONSTRAINED IN SHELLS

CROSS-REFERENCE TO RELATED APPLICATIONS

This application is a divisional of and claims priority to U.S. application Ser. No. 13/277,620 titled "COMPOSITE STRUCTURES CONTAINING HIGH CAPACITY POROUS ACTIVE MATERIALS CONSTRAINED IN SHELLS" filed Oct. 20, 2011, which claims the benefit under 35 U.S.C. §119(e) of U.S. Provisional Patent Application No. 61/406,049, titled "COMPOSITE STRUCTURES CONTAINING HIGH CAPACITY POROUS ACTIVE MATERIALS CONSTRAINED IN SHELLS" filed on Oct. 22, 2010, all of which are incorporated herein by reference in their entireties.

BACKGROUND

The commercial demand for high capacity rechargeable electrochemical cells is strong. Many areas, such as aerospace, medical devices, portable electronics, and automotive, would benefit from cells having higher gravimetric and/or volumetric capacities. Lithium ion technology has already provided substantial improvements in this regard. However, to date, the technology has been primarily constrained to low capacity graphite based negative electrodes. Graphite has a theoretical capacity of only 372 mAh/g during lithiation and its practical capacity is even lower.

Silicon, germanium, tin, and many other materials have been proposed as replacements of or additives to graphite of their high lithiation capacities. For example, the theoretical capacity of silicon is estimated to be about 4,200 mAh/g. However, many of these high capacity materials have not been widely adopted because of their poor cycle life performance, which generally results from substantial volumetric changes during lithiation. Silicon, for example, swells by as much as 400% when it is lithiated to its theoretical capacity. Volume changes of such magnitudes cause considerable stresses in high capacity active material structures and their solid electrolyte interphase (SEI) layers and typically result in mechanical fractures and pulverization of the electrode structures and significant capacity fading of the electrochemical cell.

SUMMARY

Provided are novel electrode material composite structures containing high capacity active materials formed into porous base structures. The structures also include shells that encapsulate these porous base structures. During lithiation of the active material, the shell mechanically constrains the porous base structure. The shell allows lithium ions to pass through but prevents electrolyte solvents from interacting with the encapsulated active material. In certain embodiments, the shell contains carbon, while the porous base structure contains silicon. Although silicon tends to swell during lithiation, the porosity of the base structure or, more generally, availability of the void space inside the shell helps to accommodate this additional volume within the shell without breaking it or substantially increasing the overall size of the overall electrode material composite structure. This allows integration of the composite structures into various types of battery electrodes and cycling high capacity active materials without damaging the electrodes' internal structures and deteriorating cycling characteristics of batteries.

Electrode material composite structures described herein may be used in an electrode of a lithium ion cell. In certain embodiments, an electrode material composite structure includes a porous base structure having a high capacity active material and a shell encapsulating the porous base structure. The shell mechanically constrains the porous base structure and allows passage of lithium ions through the shell during lithiation and delithiation of the high capacity active material while substantially preventing one or more electrolyte solvents from interacting with the high capacity active material encapsulated within the shell. The porosity of the porous base structure decreases during lithiation of the high capacity active material and increases during delithiation of the high capacity active material. In certain embodiments, the electrode material composite structure is a part of the negative electrode material or is a negative electrode active material. The high capacity active material may include one or more of the following materials: crystalline silicon, amorphous silicon, silicon oxides, silicon oxynitrides, tin containing materials, sulfur containing materials, and germanium containing materials. The shell may include one or more of the following materials: carbon, lithium phosphorous oxynitride (LiPON), titanium oxide, silicon oxide, aluminum oxide, tin, copper, tin alloys, and copper alloys.

In certain embodiments, the porous base structure maintains at least some porosity at any point during lithiation and delithiation of the high capacity active material. For example, the porous base structure may retain a porosity of at least about 10% when the high capacity active material is lithiated to at least about 75% of its theoretical lithiation capacity. In certain embodiments, the shell undergoes substantially no plastic deformation during lithiation and delithiation of the high capacity active material. The electrode material composite structure may include additional porous base structures. In these situations, the same shell may encapsulate more than one porous base structure. For example, a shell may form an integral encapsulating body around the multiple porous base structures. In specific embodiments, at least two porous base structures contact one another within the electrode material composite structure. In the same or other embodiments, the shell may electrically integrate multiple porous base structures.

In certain embodiments, the electrode material composite structure has an average principal dimension of between about 50 nanometers and 30 micrometers. The shell may have an average thickness of between about 1 nanometer and 100 nanometers. In certain embodiments, an intermediate layer is positioned between the porous base structure and shell. The high capacity active material of the porous base structure may include silicon, such as porous silicon, while the shell may include carbon. In the same or other embodiments, the shell may include at least one material that is not presented in the porous base structure. In certain embodiments, a volume ratio of the porous base structure to the shell is at least about ten. That is electrode material composite structures on average have ten times less of shell materials by volume than porous base materials, such as high capacity active materials.

Provided also is an electrode including an electrochemically active composite structure having a porous base structure and a shell encapsulating the porous base structure. The porous base structure includes a high capacity active material. The shell mechanically constrains the porous base structure and allows passage of lithium ions through the shell during lithiation and delithiation of the high capacity active material while substantially preventing one or more electrolyte solvents from interacting with the high capacity active material encapsulated within the shell. The porosity of the porous base structure decreases during lithiation of the high capacity active material and increases during its delithiation. The electrode also includes a conductive substrate supporting the electrochemically active composite structure and maintaining electronic communication with the high capacity active material of the porous base.

In certain embodiments, the electrode also includes a binder material supporting the electrochemically active composite structure on the conductive substrate. In the same or other embodiments, the shell of the electrochemically active composite structures attaches the electrochemically active composite structure to the conductive substrate. For example, the shell may form an integral body with a layer of a shell material formed on a surface of the conductive substrate. In certain embodiments, the porous base structure is in direct contact with the conductive substrate. For example, the porous base structure may be substrate rooted to the conductive substrate. The porous base structure is growth rooted to the conductive substrate.

Provided also is a lithium ion cell including a negative electrode having an electrochemically active composite structure. The electrochemically active composite structure includes a porous base structure having a high capacity active material and a shell encapsulating the porous base structure. The shell mechanically constrains the porous base structure and allows passage of lithium ions through the shell during lithiation and delithiation of the high capacity active material while substantially preventing one or more electrolyte solvent from interacting with the high capacity active material encapsulated within the shell. The porosity of the porous base structure decreases during lithiation of the high capacity active material and increases during its delithiation. The lithium ion cell also includes a positive electrode and electrolyte. The electrolyte provides ionic communication between the negative and positive electrodes and includes the lithium ions. In certain embodiments, the electrolyte includes one or more of the following electrolyte solvents: a carbonate, a nitrite, an ester, an amide, and a phosphate. The shell may be substantially impermeable to the one or more electrolyte solvents. The shell forms an SEI layer its exterior surface, which is separated from the porous base structure by the shell.

Provided also is a method of fabricating an electrode for use in a lithium ion cell. The method may involve providing porous base structures having a high capacity active material and forming one or more shells over the porous base structures to encapsulate this high capacity active material. The one or more shell mechanically constrains the porous base structure and allows passage of lithium ions through the shell during lithiation and delithiation of the high capacity active material while substantially preventing one or more electrolyte solvents from interacting with the high capacity active material encapsulated within the shell. The porosity of the porous base structure decreases during lithiation of the high capacity active material and increases during its delithiation. The method may also involve mixing the porous base structures encapsulated in the shells in a binder to form a slurry and coating the slurry onto a conductive substrate.

In certain embodiments, forming one or more shells involves attaching the porous base structures to a conductive substrate. This operation may start with providing the porous base structures on a conductive substrate and then forming a shell, a portion of which may form as a layer over the conductive substrate thereby attaching the porous base structures to the conductive substrate. The porous base structures may be formed by reducing fumed silica at a temperature of less than about 700° C. and/or by etching silicon structures. Porous base structures may be formed from metallurgical grade silicon. One or more shells may be formed by chemical vapor deposition of a carbon-containing material on the porous base structures. In other embodiments, forming the one or more shells may involve carbonizing a polymer precursor.

These and other embodiments are described further below with reference to the figures.

DETAILED DESCRIPTION OF EXAMPLE EMBODIMENTS

Figure 1:
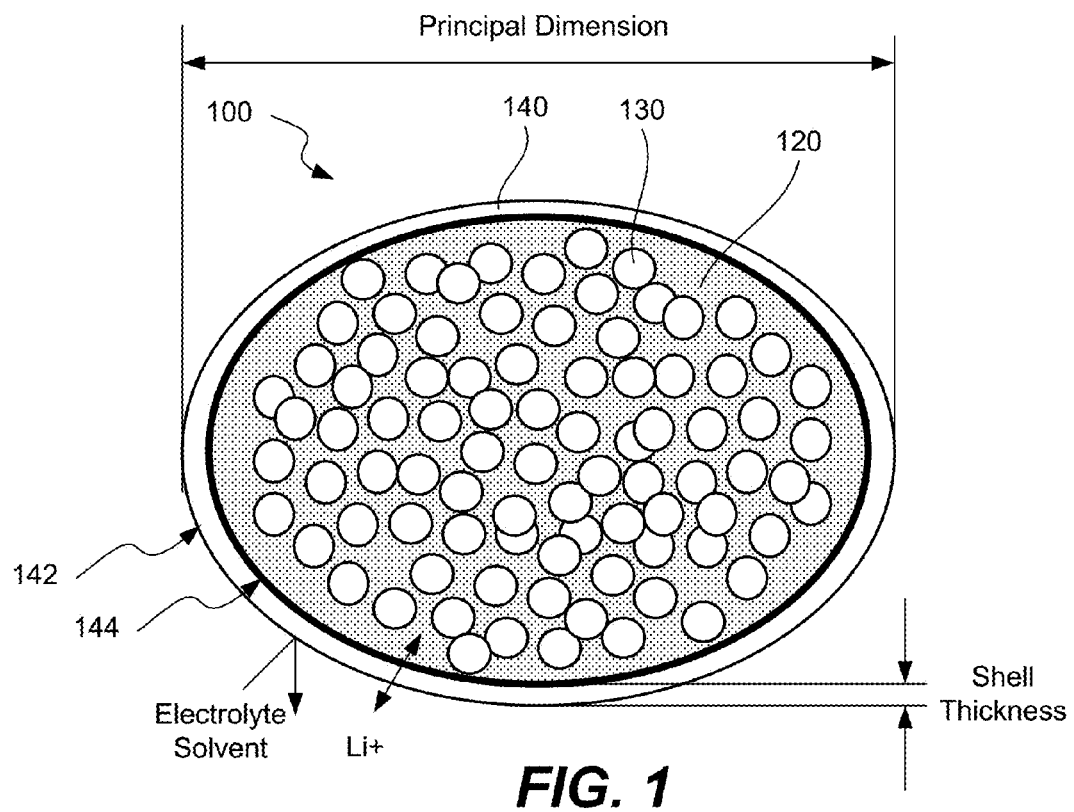
FIG. 1 is a schematic representation of a cross sectional view of an electrode material composite structure, in accordance with certain embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

While high capacity electrochemically active materials may improve capacity of electrochemical cells, many of these materials exhibit substantial volume changes during battery cycling, such as swelling during lithiation and contracting during delithiation. For example, silicon can swell as much as 400% during lithiation to its theoretical capacity of about 4200 mAh/g in a $Li_{4.4}Si$ structure. Volume changes of this magnitude can cause pulverization of the internal electrode structures, losses of electrical connections with the electrode, and capacity fading of the cell.

Without being restricted to any particular theory, it is believed that lithiation-delithiation cycles correspond to large tensile stresses in the high capacity active material structures, which causes cracking and other forms of mechanical damage within these structures and internal electrode structures in general. As a result, electrodes fabricated with high capacity active materials may experience pulverization of the active material structures if these structures are larger than certain fracture limits for such materials, e.g., a few hundreds of nanometers for silicon. These mechanical fractures may lead to losses of electrical connections within the electrodes, and portions of the active material may become disconnected and electrochemically idle resulting in capacity fading. Additional problems may appear from high capacity active material structures damaging their solid electrolyte interface (SEI) layers when these structures swell during lithiation and contract during delithiation. The SEI layers may continue to break and self-repair long after formation cycling and contribute to additional capacity fading by thickening the overall SEI layer, consuming lithium and electrolyte solvents, and other reasons.

Proposed are novel electrode material composite structures that include porous base structures containing high capacity active materials and shells encapsulating these porous base structures. The shells are designed to mechanically constrain the porous bases during lithiation-delithiation cycling. While the shells allow lithium ions to pass through, they prevent electrolyte solvents and/or other electrolyte components from interacting with the high capacity active materials. As such, the porous base structures generally do not form SEI layers and remain protected by the shell. Instead, an SEI layer may be formed on the exterior surface of the shell that is exposed to all electrolyte components. Even though the high capacity active material may swell inside the shell during lithiation, the porosity of the porous base structures may be sufficient to accommodate additional volume. In general, the shell has sufficient unoccupied space within the porous based structure and in between the porous base structures and the shell available to accommodate swelling of the high capacity active material corresponding to operating lithiation limits of the high capacity active material. This space may come from pores of the porous base structure and, in certain embodiments, from voids between the shell and base structures. The available space is partially or fully occupied during lithiation and then forms again during delithiation. There may be some redistribution of available space inside the shells, e.g., between pores and voids, during cycling.

A brief description of an example may help to provide better understanding of various structural and functional features. A porous base structure may include silicon, while the corresponding shell may include carbon. Porous silicon structures may be formed using silica as a starting material or etching silicon particles. Carbon shells are then formed over these porous silicon structures resulting in electrode material composite structures. These composite structures may be integrated into negative electrodes during formation of the carbon shells such that the carbon shells are used for attaching the composite structures to the conductive substrate. Alternatively, these composite structures may be integrated into negative electrodes after formation of the carbon shells, for example, by mixing the composite structures together with a polymer binder into slurry and coating the slurry onto a conductive substrate. During lithiation, silicon swells inside the carbon shells, but the porosity of the silicon base structures is sufficient to accommodate this swelling. The initial porosity may be selected such that there is still some porosity or, more generally, free space remaining inside the shell when silicon is lithiated to its operating capacity. It should be noted that an operating capacity does not always correspond to the theoretical capacity of the selected active material. For example, an electrode containing these porous silicon structures may be lithiated only to between about 1500 mAh/g and 3000 mAh/g. In certain embodiments, a shell may contribute to the overall capacity of the composite structures.

Returning to the previous example, when silicon lithiates and swells it generally becomes softer. On the other hand, when carbon lithiates, it becomes harder and more resistant to mechanical stresses in additional to substantially retaining its initial volume. As such, the carbon shell becomes more capable of constraining the swelling silicon base structure, while soften lithiated silicon more readily redistributes within the shell and occupies available free spaces. Lithiation levels, porosity, shell thickness, and other parameters may be selected such that the shell does not break or collapse during cycling. During discharge, silicon contracts and may form pores and/or void inside the shell. The process then repeats during subsequent cycles without damaging the carbon shell.

While the high capacity active material inside the shell may swell and contact during cycling, the shell itself may stay relative intact. In certain embodiments, the composite structure or, more specifically, the shell does not substantially change its outer principal dimension during cycling. In other embodiments, the composite active materials structures experience minimal external volume change that is still acceptable for integration into various electrode systems, such as a binder system without exceeding elastic characteristics of the binder. Examples of binder materials include polyvinylidene fluoride (PVDF) and/or polyacrylic acid (PAA) based binders. In certain embodiments, a principal dimension of the composite structure may change by less than about 20% or, more particularly, less than about 10%, during cycling. It should be noted that these dimensional changes of the structure or shell are substantially less than corresponding changes of the high capacity active material encapsulated in the shell. The volume change of the high capacity active material is predominantly accommodated by pores of the porous base structure and, in certain embodiments, voids between the porous base structure and shell.

Although a number of embodiments are described herein with reference electrodes that undergo lithiation during cell charging, i.e., negative electrodes, it should be understood that such electrode material composite structures and methods may be also used for electrodes that lithiates during cell discharging, i.e., positive electrodes. Similar to silicon that swells during lithiation and may be incorporated into porous base structures for use in negative electrodes, a number of positive electrode active materials also undergo volume changes during lithiation. Examples of such positive electrode active materials include lithium cobalt oxide, nickel cobalt aluminum oxide, nickel cobalt manganese oxide, and others known to a person having ordinary skills in the art.

FIG. 1 is a schematic cross-sectional representation of electrode material composite structure 100, in accordance with certain embodiments. Composite structure 100 includes porous base structure 120 containing a high capacity active material. Specifically, FIG. 1 illustrates multiple pores 130 dispersed throughout porous base structure 120. Porous base structure 120 is encapsulated into shell 140, which is configured to mechanically constrain porous base structure 120 during lithiation. In certain embodiments, shell 140 does not undergo plastic deformation even when the high capacity active materials of porous base structure 120 expands and contracts during cycling. Shell 140 is permeable to lithium ions and allows lithium ion to travel through shell 140 during lithiation and delithiation of the high capacity active material of porous base structure 120. At the same time, shell 140 may be configured to substantially prevent one or more electrolyte solvents from interacting with the high capacity active material of porous base structure 120. Therefore, shell 140 may be substantially impermeable to these electrolyte solvents. In these situations, an SEI layer forms on external surface 142 of shell 140.

Permeability and mechanical constraint characteristics of shell 140 depend on its material compositions, thickness, overall dimensions, and other factors. A thickness of shell 140 may vary and may be generally characterized by an average thickness. In other embodiments, the thickness may be substantially uniform throughout the entire shell. In certain embodiments, the average thickness of shell 140 is between about 1 nanometer and 100 nanometers or, more particularly, between about 5 nanometers and 25 nanometers. The overall dimension of electrode material composite structure 100 or, more specifically, of the external surface 142 of shell 140 may be characterized by a principal dimension. For the purposes of this document, the principal dimension of an electrode material composite structure is its largest overall dimension as shown in FIG. 1. The principal dimension may be limited on the upper end by a maximum principal dimension and/or on the lower end by a minimum principal dimension. Smaller composite structures may encapsulate very small amounts of the active material and require relative large shell for this purpose. As a result, such structures may have an excessive external surface area per volume ratio resulting in too much shell materials with respect to high capacity active materials. It should be noted that shell materials may contribute very little or nothing to the overall lithiation capacity of the composite structure and generally amounts of the shell material should be minimized relative to amounts of the porous core materials or, more specifically, relative to the high capacity active materials. On the other hand, larger structures may be difficult to process using various electrode fabrication techniques, such as mixing, coating, and pressing further described below with reference to FIG. 3. Further, large structure may exceed fracture limits of the shell and/or high capacity active materials and result in mechanical deterioration of the high capacity materials inside the shell. Increase in the principal dimension of the shell generally makes it weaker and this factor may create an upper limit for the overall dimension particularly for composite structures containing high capacity active materials that are more prone to swelling during lithiation and/or for composite structures performing at a broader lithiation range.

Principal dimensions of multiple structures used in the same electrode may vary, for example, similar to the size distribution of graphite or lithium cobalt oxide particles. Therefore, electrode material composite structures are typically characterized with an average principal dimension. In certain embodiments, an average principal dimension of the composite structure is between about 50 nanometers and 30 micrometer or, more specifically, between about 0.5 micrometer and 10 micrometers. A composite structure can be in the form or particles with low aspect ratios and/or rods, tubes, or wires with high aspect ratios (e.g., greater than about four).

Size and other characteristics of composite electrode structure may depend on composition and morphology of high capacity active materials forming porous base structures. For example, crystalline silicon, as opposed to amorphous silicon, may be more acceptable for smaller composite structures. Furthermore, a composite design makes it possible to use larger high capacity active materials structures than would not be possible without encapsulation. For example, substantially pure silicon structures can exceed their fracture limits and start fracturing during lithiation cycling when all three dimensions exceed a few hundred of nanometers. Yet, some silicon-containing composite structures described herein can be as large as 1 micrometer and even 10 micrometers and operate without fracturing of the composite structures. Fracturing of high capacity active materials within the shell is a lesser concern because these materials are porous and are encapsulated in a shell that can prevent outer expansion of the active materials and maintain electrical and mechanical connections between fractured parts. Even if some fracturing occurs during cycling, the shell prevents the resulting fragments of the active materials from becoming electrically and mechanically separated from the rest of the composite structure. Some separation between different fragments of the porous base structure may be possible, where mechanical and electrical integration between these fragments is accomplished through the shell.

As mentioned above, porous base structure 120 includes one or more high capacity active materials, such as silicon, amorphous silicon, silicon oxides, silicon oxynitrides, tin containing materials (e.g., tin, tin oxide, titanium oxide), sulfur containing materials, and germanium containing materials, variety of metal hydrides (e.g., $MgH_2$), silicides, phosphides, and nitrides. Other examples of active materials and their combinations include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, tin doped with carbon, and silicon mixed with oxides. High capacity active materials are generally defined as active materials with theoretical lithiation capacities of at least about 700 mAh/g. In certain embodiments, a portion of high capacity active materials in the active layer is at least about 50%, or at least about 75%, or at least about 80%, or at least about 85%, or at least about 90% relative to the total amount of the negative active materials. Doped and non-stoichiometric variations of these materials may be used as well.

Porous base structure 120 may have an initial porosity (before any lithiation) that is selected based on expected swelling characteristics of the high capacity active material and targeted lithiation levels, which is sometimes referred to as an operation capacity. In certain embodiments, an operation capacity of the high capacity active material may be at least about 50% of it theoretical capacity or, more specifically, at least about 75% of the theoretical capacity or even at least about 90% of the theoretical capacity. This porosity will change during cycling as the high capacity active material lithiates and expands. For example, the volume per silicon atom for crystalline silicon is about 0.02 nm$^3$, for $Li_{12}Si_7$—about 0.06 nm$^3$, for $Li_{14}Si_6$—about 0.052 nm$^3$, for $Li_{13}Si_4$—about 0.067 nm$^3$, and for $Li_{22}Si_5$ about 0.082 nm$^3$, where $Li_{22}Si_5$ is a theoretical lithiation limit for silicon corresponding to a capacity of about 4200 mAh/g.

Porous base structure 120 generally becomes less porous as the high capacity active material lithiates and becomes more porous when lithium is removed. In certain embodiments, porous base structure 120 retains some porosity even when the high capacity active material is charged to its operating capacity, which is typically less than its theoretical capacity. For example, a porous base may have a porosity of at least about 5%, or more specifically, of at least about 10% or even at least about 25% when the high capacity active material is lithiated to its operating capacity that may correspond to at least about 50% or to at least about 75% of its theoretical capacity. In specific embodiments, a high capacity active material includes silicon and it is charged to the operational capacity of between about 2000-3000 mAh/g. The porous base structure retains some porosity at this lithiation level. The porosity at the operational capacity limit may be between about 5% and 25% or, more specifically, between about 10% and 20%. Specific charge levels for silicon containing active materials may be about 2500 mAh/g or at about 3000 mAh/g.

Pores of a porous base can be interconnected (i.e., an open-cell structure) or separated (i.e., a close-cell structure). If a porous base has interconnected pores, the pore sizes need to be sufficiently small to avoid substantial filling of the pores during formation of the shell (e.g., deposition). In certain embodiments, a deposition rate is sufficiently fast that there is not enough time for the pores to fill before they are effectively "plugged" with shell material.

In certain embodiments, an average distance between pores in the porous base is between about 1 nanometer and 500 nanometers or, more particularly, between about 10 nanometers and 100 nanometers, at least for the initial porous base structure. This average distance determines the wall thicknesses formed by the high capacity active materials between the pores. In certain embodiments, this distance is kept below the fracture threshold. However, as above, even fractured fragments of the base may remain electrochemically active when they remain electronically connected to the other base portions or to the shell if the shell itself is electronically conductive. It is also possible that the porosity or the arrangement of the pores of the initial porous base structure may change after initial cycling and may continue to change throughout its cycle life. In some embodiments, an average pore size is between about 5 nanometers and 2 micrometers or, more particularly between about 20 nanometers and 500 nanometers. In some arrangements, the average pore size is larger than the average distance between pores. Pores of the porous base structure may be closed pores or open pores.

Shell 140 materials may be selected to provide the above mentioned mechanical and permeability characteristics. These materials may be electrochemically active and/or electrochemically inert. Some examples of shell materials include carbon, lithium phosphorous oxynitride (LiPON), silicon oxide, aluminum oxide, titanium oxide, tin and tin alloys, copper and copper alloys. Generally, shell materials are different from porous base structure materials in terms of their composition and/or morphology. For example, a carbon shell can be used in combination with a mesoporous silicon base. During lithiation the carbon shell may become harder, while the internal silicon mesoporous structure becomes softer. The hardened shell better constrain the swelling silicon, which becomes softer upon lithiation, and may cause the silicon to fill its internal pores instead of allowing the overall composite structure to swell. Some of the shell materials listed above are compatible with conventional electrolytes and creates a stable SEI layer with such electrolytes.

Generally, a shell substantially encapsulates each porous base structure without substantially filling the pores of the base. However, in certain embodiments, multiple porous base structures may contact each other such that no shell materials are provided at these contact interfaces. Furthermore, in certain embodiments, porous base structures may contact a conductive substrate and there is no shell material provided at that interface. These embodiments are further described below with reference to FIGS. 2A-2C. However, regardless of these encapsulation schemes, the porous base structures are protected from direct contact with electrolyte solvents.

Some studies on flat silicon films have measured compressive stresses between 0.5 and 2 MPa upon lithiation. It has not been possible to measure this on individual nanowires, but it is likely within this range or lower, i.e., the maximum stress the inner porous material could exert on a constraining shell assuming zero porosity at the interface between core and shell, could be on the order of 1.5 to 2.0 MPa. A shell may be configured to accommodate this level of stress. Generally, shells are made from one or more hard materials. Overall, expansion and strain relief inside the high capacity active materials is achieved by providing a robust shell and having adequate porosity within the active material.

In certain embodiments, shell 140 is used to conduct electrical currents to and from the high capacity active material of the porous base structure. Therefore, shell 140 may be made from a conductive material. Furthermore, shell 140 may need to maintain a substantial contact with porous base structure 120 particularly when the high capacity active materials contacts during delithiation. In certain embodiments, intermediate layer 144 is provided between shell 140 and porous base structure 120 to maintain adhesion and prevent delamination of porous base structure 120 and shell 140. However, formation of some voids at the interface between porous base structure 120 and shell 140 may be acceptable. Intermediate layer 144 may be used to prevent reaction between porous base structure materials (e.g., high capacity active materials) and shell materials and formation of undesirable compounds at the interface, such as silicon carbide, which can be formed when a silicon porous base is in direct contact with a carbon shell. Examples of useful materials for the intermediate layer 144 include conductive binders, such as PVDF or other conducting polymers.

Figure 2A:
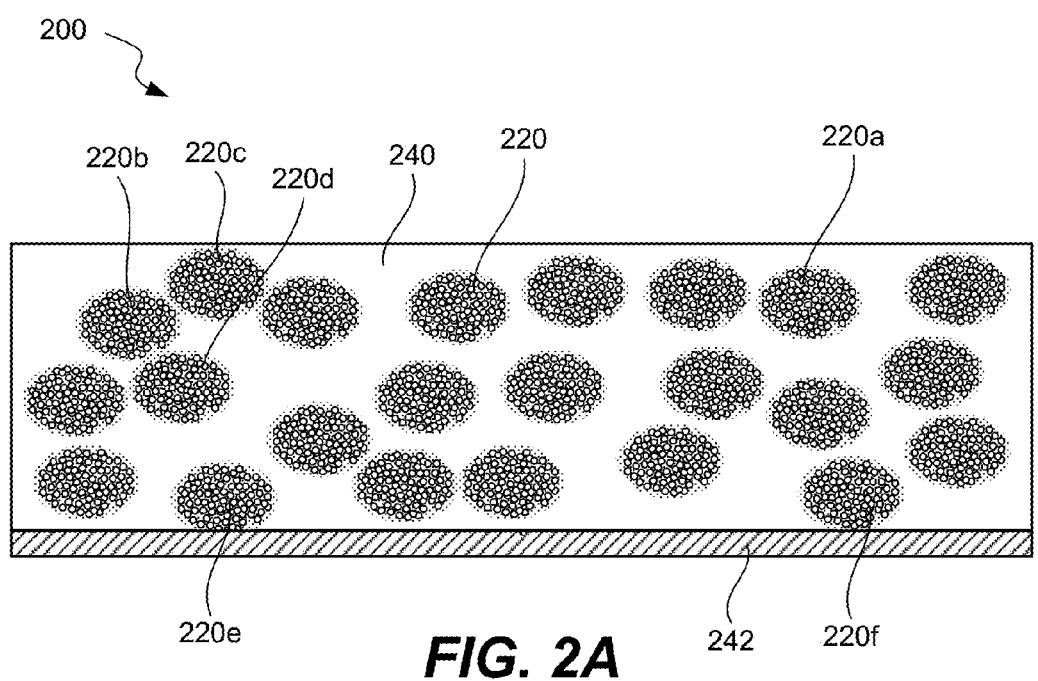
FIG. 2A is a schematic representation of a cross sectional view of an electrode material composite structure having multiple porous base structures encapsulated by the same shell, in accordance with certain embodiments.

In certain embodiments, the same shell may encapsulate multiple porous base structures. Specifically, FIG. 2A is a schematic representation of a cross sectional view of an electrode material composite structure 200 having multiple porous base structures 220 encapsulated by the same shell 240, in accordance with certain embodiments. Porous base structures 220 may be individually encapsulated. For example, porous base structure 220a is fully surrounded by shell material and does not contact any other components of electrode material composite structure 200. Some porous base structures may touch each other, as for example, porous base structures 220c-220d. These "touching" structure may have some overlap (e.g., forming a joined body) of their high capacity active materials. As such there may be direct electronic and ionic pathways between these structures where the electrons and ions do not have to go through the shell first.

In certain embodiments, electrode material composite structures 200 may also include conductive substrate 242 and shell 240 may be used to mechanically attach multiple porous base structures 220 to substrate 242 as shown in FIG. 2A. Further, shell 240 may provide electronic communication between multiple porous base structures 220 and substrate 242 and to allow lithium ions to transfer through shell 240 and reach multiple porous base structures 220. When the substrate is present, some porous base structure, like porous base structure 220e and 220f may be contact substrate 242. Specifically, some porous base structures may have a direct electrical communication with substrate 242. In some embodiments, shell 240 forms a monolithic or continuous layer encapsulating multiple porous base structures 220. In other embodiments, most electrode material composite structures are attached to the substrate using polymer binder or some other components that are not parts of electrode material composite structures.

Typically, though not necessarily, a substrate is made from conductive material, having a conductivity of at least about $10^3$ S/m, or more specifically at least about $10^6$ S/m or even at least about $10^7$ S/m. Examples of suitable substrate materials include copper, titanium, aluminum, stainless steel, doped silicon, and other materials.

Figure 2B:
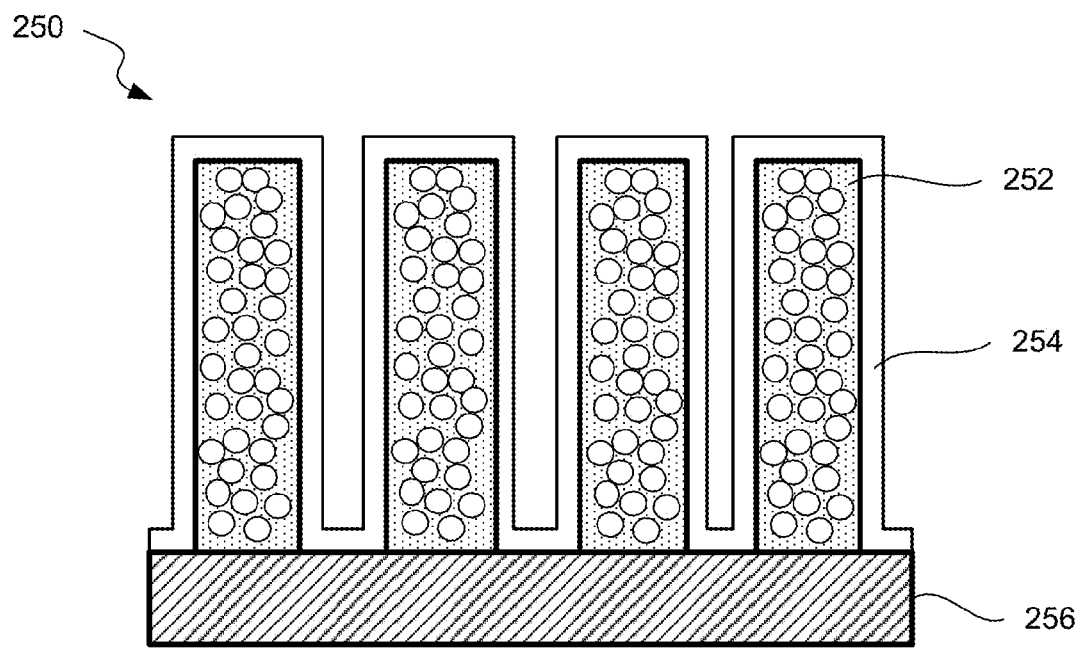
FIG. 2B is a schematic representation of a cross sectional view of an electrode material composite structure having multiple substrate rooted porous base structures, in accordance with certain embodiments.

In certain embodiments, all or substantially all porous base structures are directly connected to a conductive substrate (i.e., current-collecting substrate). Sometimes these examples are referred to as substrate rooted porous base structures or, in more specific embodiments, growth rooted porous base structures, i.e., when the porous base structures are attached to the substrate during their formation and growth. Various examples of substrate rooted and growth rooted structures are described in U.S. patent application Ser. No. 12/437,529, entitled "ELECTRODE INCLUDING NANOSTRUCTURES FOR RECHARGEABLE CELLS," filed on May 7, 2009, which is incorporated herein by reference in its entirety for purposes of describing substrate rooted and growth rooted structures. Specifically, substrate rooted porous base structures are structures that are physically and conductively attached to a substrate, which may serve as a current collector for an electrode. Substrate rooted porous base structures may be rooted to the substrate at random locations on the structure's profiles (randomly rooted) or rooted preferentially at some particular location on the structures (non-randomly rooted), as shown in FIG. 2B. Examples of non-randomly rooted nanostructures include terminally rooted structures (shown in FIG. 2B), medially rooted structures. Terminally rooted structures are preferentially affixed to the substrate at a terminal or distal end of the structures. This assumes that the structures have (in general) some principal dimension that is longer than other dimensions of the structures.

FIG. 2B is a schematic representation of a cross sectional view of an electrode material composite structure 250 having multiple substrate rooted porous base structures 252, in accordance with certain embodiments. Each porous base structure 252 is shown attached to substrate 256 with one of its ends. There may be no shell material at the interface of porous base structures 252 and substrate 256. Shell 254 may cover the remaining surface of porous base structures 252 and, in certain embodiments, any exposed surface of substrate 256, i.e., in between substrate rooted porous base structures 252. In certain embodiments, shell 254 is used to support porous base structures 252 onto substrate 256. Because porous base structures 252 have direct contact with substrate 256, a less electronically conductive material may be used for shell 254. Still, shell 254 should be ionically conductive to allow lithium ions to go in and out substrate rooted porous base structures 252 though shell 254.

Figure 2C:
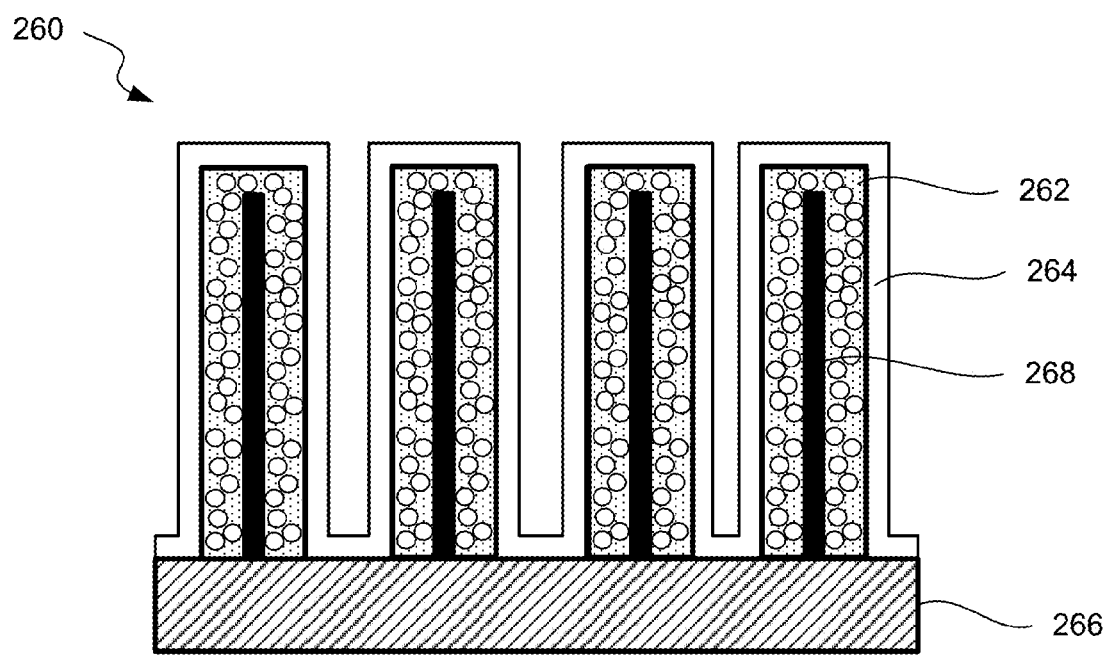
FIG. 2C is a schematic representation of a cross sectional view of an electrode material composite structure having multiple porous base structures formed over template structures, in accordance with certain embodiments.

FIG. 2C is a schematic representation of a cross sectional view of an electrode material composite structure 260 having multiple porous base structures 262 formed over template structures 268, in accordance with certain embodiments. Template structures 268 may be used for providing mechanical support and/or electronic communication between porous base structures 262 and substrate 266. Some examples of templates include nanowires, nanotubes, particles, and films. In certain embodiments, templates are silicide nanowires, more specifically, silicide nanowires that are growth-rooted to the conductive substrate. Various examples of templates are described in U.S. patent application Ser. No. 13/039,031, entitled "TEMPLATE ELECTRODE STRUCTURES FOR DEPOSITING ACTIVE MATERIALS," filed on Mar. 2, 2011 and U.S. patent application Ser. No. 13/114,413, entitled "MULTIDIMENSIONAL ELECTROCHEMICALLY ACTIVE STRUCTURES FOR BATTERY ELECTRODES," filed on May 24, 2011, which are incorporated herein by reference in their entireties for all purposes.

Composite structures described above may be used for fabricating lithium ion electrodes and batteries as is further described in the context of FIGS. 5A-5B below. In certain embodiments, in addition to the composite structures described above, an electrode also includes a conductive substrate supporting the composite structures using a polymeric binder material. The structures form an electrode layer over the conductive substrate. In certain embodiments, the electrode layer has a thickness of at least about 50 micrometers. In the same or other embodiments, the electrode layer has a porosity of less than about 25%.

Porous base structures can be formed by various techniques described below. In general, these techniques can be grouped into top down types and bottom up types. Top down techniques involve removing some material from, for example, initially solid structures to form porous base structures. Such techniques include, but are not limited to, SiOx reduction, electrochemical etching, and chemical etching. Bottom up techniques may start with a substrate containing no high capacity active material or a limited amount of high capacity active material and building porous base structures up from or on that substrate. Such methods include, but are not limited to, chemical vapor deposition (CVD), physical vapor deposition (PVD), agglomeration, electrodeposition, and sintering. Examples of techniques for ensuring that the base structures are porous include, but are not limited to plasma hydrogenation, electrochemical lithiation/delithiation, ion implantation, gas insertion, cavitation via sonication in Si melt mixture, and sol gel synthesis.

Figure 3:
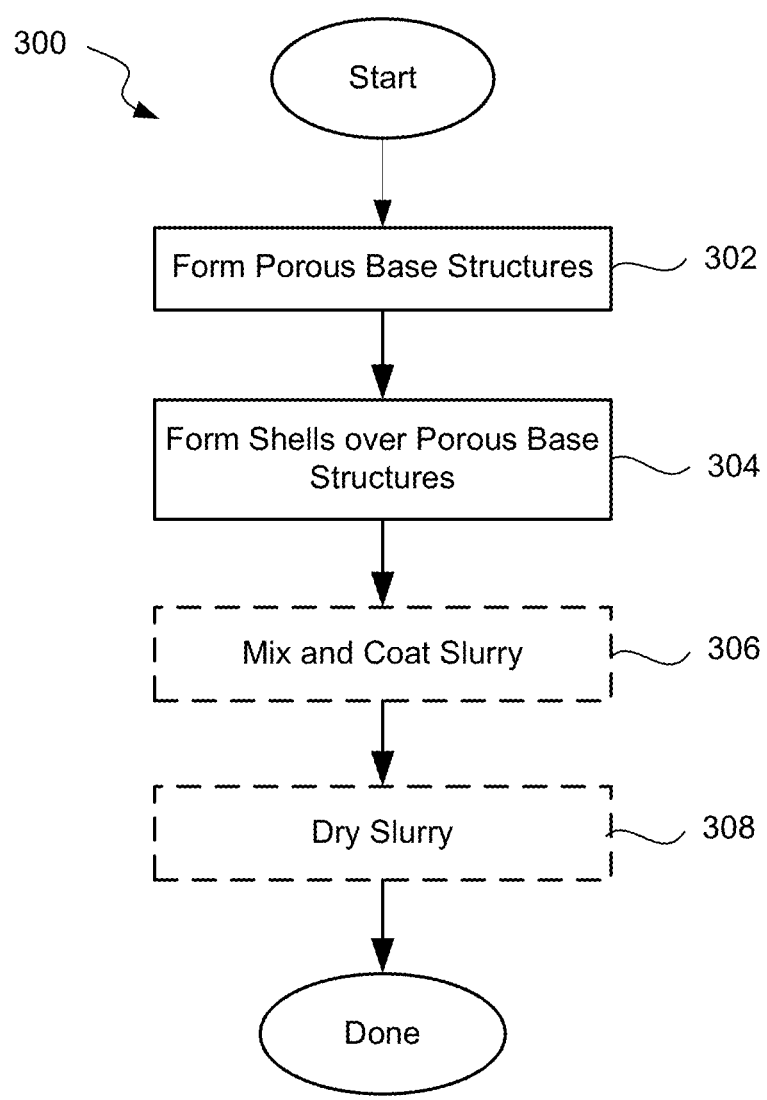
FIG. 3 is a process flowchart corresponding to a method of fabricating an electrode containing electrode material composite structures, in accordance with certain embodiments.

FIG. 3 is a process flowchart corresponding to method 300 for fabricating a lithium ion cell electrode, in accordance with certain embodiments. Method 300 may start with forming porous base structures that include one or more high capacity active materials during operation 302. In one embodiment, porous bases containing silicon are formed by reducing silicon oxides, such as fumed silica, at a temperature of less than about 900° C. Certain reduction catalysts, such as magnesium (Mg) or solutions of potassium chloride (KCl), lithium chloride (LiCl), and calcium chloride (CaCl$_2$), may be used to reduce silicon at lower temperatures, such as at temperatures between about 500° C. and about 700° C. This allows the original porous base structure of the silica to be retained without densification. Additionally, the processing conditions for these catalysts (e.g., pressure, temperature, environmental conditions, and reductance ratio) can be tuned to increase or decrease the porosity by controlling the removal of oxygen. In other embodiments, porous bases containing silicon are formed by etching silicon structures.

Figure 10A:
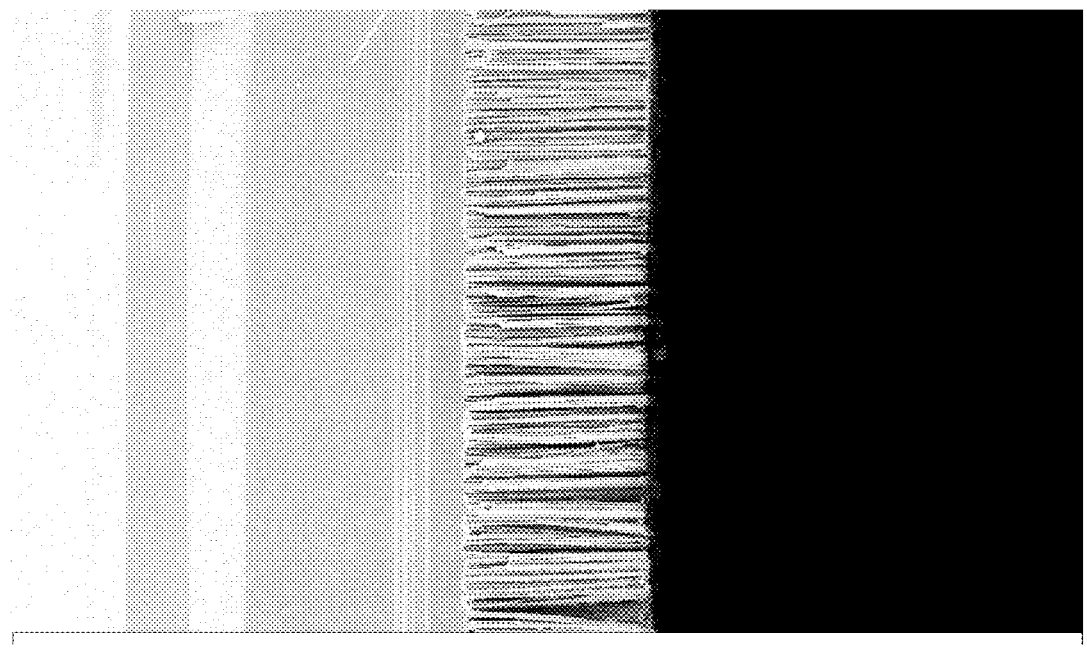
FIGS. 10A-10D are scanning electron microscopy (SEM) and transmission electron microscopy (TEM) images of silicon nanowires produced by electrochemical etching processes.
Figure 10B:
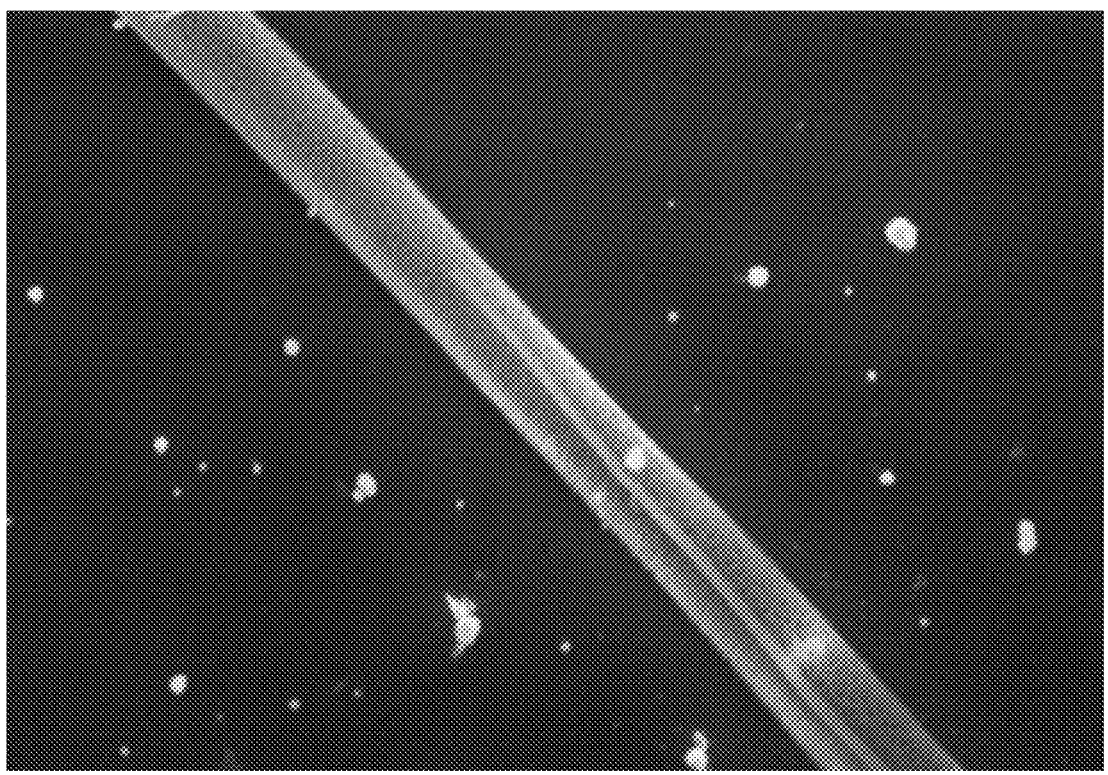
Figure 10C:
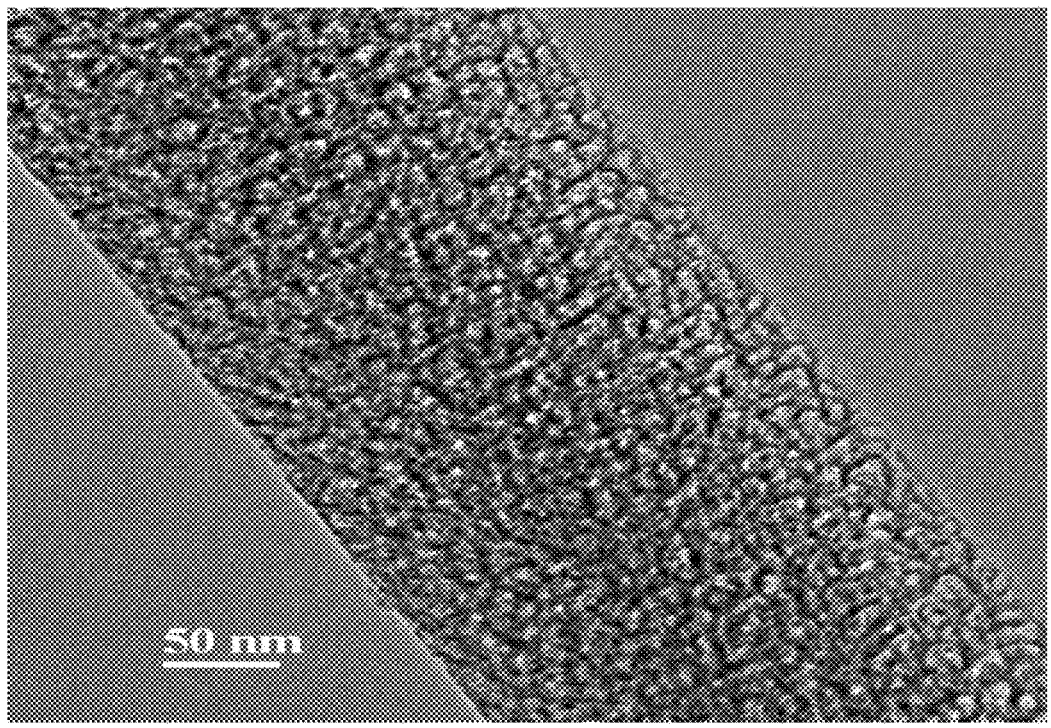
Figure 10D:
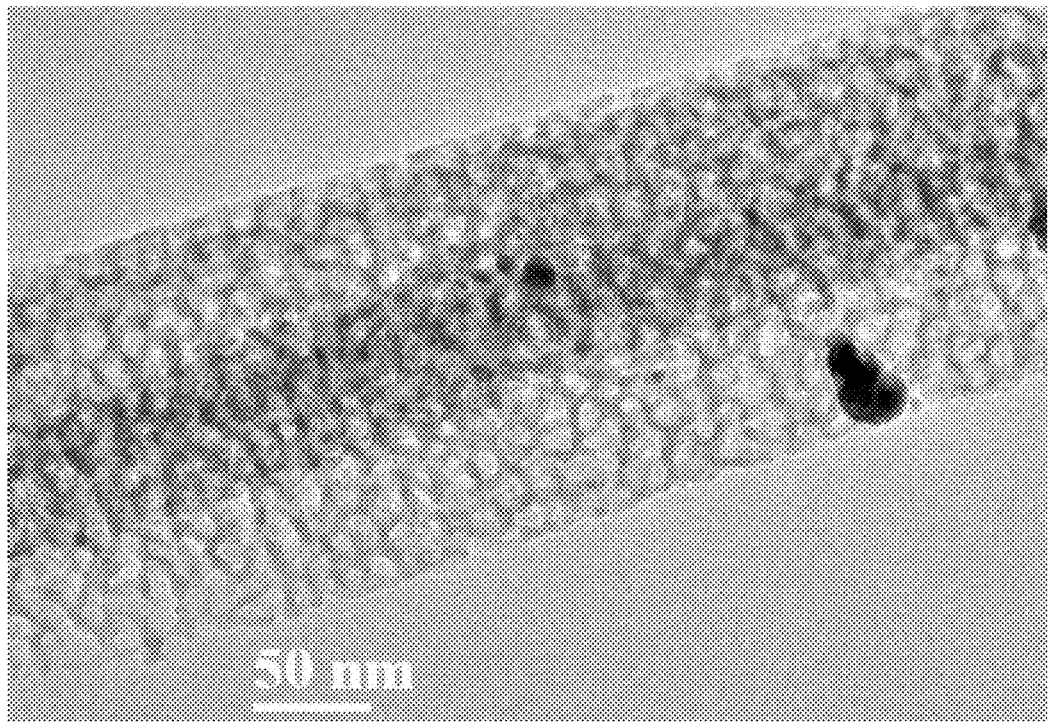

Metal-assisted etching may also be used to produce nanowire and/or nanoparticles with defined porosities. For example, highly p-doped wafers or other silicon structures may be etched by using hydrogen fluoride (HF) based etch solution, e.g., having a concentration of HF of about 5M, that also contains silver nitrate, e.g., having a concentration of between about 0.01M and about 0.05M. Silver ions nucleate on the silicon surface and drive an etch process (corrosion) electrochemically. This process may be performed at temperatures between about 25° C. and about 50° C. The etch process can produce nanowires with porosity, for example, between about 30% and 90% depending on the level of the p-type doping in the silicon, etch time, temperature, and/or other process parameters (such as concentration of the etchant solution and catalyst, pH, and voltage and/or current applied in the case of electrochemical etching). Some nanowire examples produced by the electrochemical etching process are shown in SEM and TEM images presented in FIGS. 10A-10D. More specifically, FIG. 10C illustrates a silicon nanowire that was etched for at about 1 hour, while FIG. 10D illustrates a silicon nanowire that was etched for about 2 hours. It has been found that electrochemical etching often results in porous silicon structures.

In certain embodiments, an anodic potential is applied to the silicon during the etching process. Wafer doping type and amount and etch duration may impact the porosity of the resulting structure. Lower aspect ratio structures (e.g., nanoparticles) may be formed from high aspect ration structures (e.g., nanowires) by crushing the high aspect ratio structures, for example, in a ball mill or other suitable tools.

For making porous base structures containing silicon, a starting material may be silica structures that have a controlled porosity, such as fumed silica produced as a byproduct in metallurgical grade silicon fabrication. A concentration of carrier gases and/or other process conditions may be adjusted in these processes to achieve desired porosities of silica structures. The size of silica structures can be controlled by using a fluidized reactor with either additional silicon precursors or with reductive agents/etchants. These porous base structures are then reduced to porous silicon bases using one of the aforementioned reduction pathways.

In certain embodiments, metallurgical grade silicon is crystallized from a melt. Porosity of the resulting silicon can be controlled by various conditions during the crystallization. In one arrangement, the molten silicon is processed using one or more sonication techniques to introduce bubbles that are incorporated into the crystallization. In another arrangement, the porosity is adjusted by adjusting the quench or cooling rate of the solid. Furthermore, reactive gases such as hydrogen ($H_2$), iodine ($I_2$), sulfur hexafluoride ($SF_6$), and bromine ($Br_2$), can be used to control porosity by alloying and removing some of the silicon as they form gas phase silicides and act like a gas phase etchant.

In another embodiment, porous silicon structures are formed using liquid silane precursors, low temperature thermal treatment, and/or laser depolymerization. In one example, silane can be electrospun in toluene and then being polymerized and heated to form amorphous silicon fibers. Other examples include CVD hydrogenation, etching, and sol gel techniques.

In yet another embodiment, porous silicon structures are formed using agglomeration and/or interconnection techniques. A process may start with forming nanoscale silicon particles using one of the processing techniques described above, e.g., gas phase reaction, reduced silica, and others. Precursors and processing gases for forming the initial particles may include trichlorosilane, silicon tetrachloride, monosilane, manganese silicide, and/or iodine. This initial operation may yield amorphous silicon particles that are between about 100 nanometers and 600 nanometers in diameter. These initial particles may have some internal porosity of their own as controlled by their synthesis conditions but may not have the desired porosity to allow for effective restraint by encapsulation.

The process continues with agglomeration of the nanoscale particles, such as in a fluidized synthesis chamber or bath. Fluidized synthesis chambers or bathes would create a suspension of the nanoparticles and the particles would freely stick to each other—i.e. aggomlerate. Cluster size would depend on residence time, flow rates, particle density, temperature, and process gas concentrations. This operation may form clusters that are a few micrometers in diameter. In certain embodiments, original nanoscale particles are loosely interconnected within the synthesis suspension until they reach a desired meso/macroparticle size and, in certain embodiments, a desired weight that may separate them from other smaller particles floating in the reactor. This "self-packing" can be controlled in such a way to achieve sufficient internal spacing among the original nanoscale nanoparticles to create pores and an effective meso/macroparticle internal porosity to allow room for expansion once the agglomerate is encapsulated by a constraining outer layer and then lithiated. In certain embodiments, the fabrication process may involve pre-lithiation of porous cores and/or shells. For example, active material structures with porous silicon cores can be pre-lithiated to at least about 500 mAg/g or, more specifically, to at least about 1000 mAg/g or even to at least about 1500 mAg/g.

Returning to FIG. 3, method 300 continues with forming shells over external surfaces of the porous base structures during operation 304. In certain embodiments, this operation involves chemical vapor deposition (CVD) of a carbon-containing material, for example, over silicon containing porous base structures. In other embodiments, forming shells involves carbonizing a polymer precursor, for example, over silicon containing porous base structures. Some examples of techniques for forming a shell to encapsulate porous base structures involve CVD, sol gel techniques, carbonizing of precursor polymers, coating with solid polymer electrolyte, or physical vapor deposition (PVD), of carbon.

Method 300 may proceed with mixing the composite structures with a polymeric binder and other materials to form a slurry and coating the slurry onto a conductive substrate during optional operation 306 and then drying the slurry during optional operation 308. The description below presents additional details of a slurry based deposition technique. In other embodiments, electrode material composite structures may be attached to a substrate while forming porous base structures during operation 302 and/or while forming shells over the porous base structures during operation 304. For example, porous base structures may be substrate rooted structures as explained below. In the same or other embodiments, porous base structures may be first positioned onto the substrate but not necessarily attached to the substrate. Later, the attachment may be provided by forming shells over the porous base structures.

The final slurry mix typically contains all materials of the electrode active layer, e.g., composite structures, binders, and conductive additives, and a solvent. A binder is used to hold the active material and the conductive agent on the substrate. Generally, the amount of binder is between about 2 and 25 weight percent of the active layer based on the solid content (i.e. excluding solvent).

The solvent can be aqueous or non-aqueous, depending on the kind of binder used. Some examples of "non-aqueous binders" include poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC), polyacrylic, and polyethylene oxide, and combinations thereof. For example, 10-20 weight percent PVDF dissolved in N-methyl-2-pyrrolidinone (NMP) may be used. As another example, a combination binder using 1-10 weight percent of polytetrafluoroethylene (PTFE) and 1-15 weight percent of carboxymethylcellulose (CMC) may be used. Another example is polyacrylonitrile (PAN).

Examples of "aqueous binders" include carboxymethyl cellulose and poly (acrylic acid), and/or acrylonitrile-butadiene copolymer latex. One specific example of an aqueous binder is polyacrylamide in combination with at least one of the following copolymers: carboxylated styrene-butadiene copolymer and styrene-acrylate copolymer. The ratio of polyacrylamide to such copolymer may be between about 0.2:1 to about 1:1 on a dry weight basis. In another specific example, the aqueous binder may include a carboxylic acid ester monomer and a methacrylonitrile monomer. In another specific example, the binder may include a fluoropolymer and a metal chelate compound. The fluoropolymer may be polymerized from fluorinated monomers, such as vinyl fluoride (VF), vinylidene fluoride (VdF), tetrafluoroethylene (TFE), trifluoroethylene (TrFE), chlorotrifluoroethylene (CTFE), fluorinated vinyl ethers, fluorinated alkyl acrylates/methacrylates, perfluoroolefins having 3-10 carbon atoms, perfluoro C1-C8 alkyl ethylenes and fluorinated dioxoles. The metal chelate compound may be in the form of a heterocyclic ring with an electron-pair-acceptor metal ion, such as titanium and zirconium ions, attached by coordinate bonds to at least two electron-pair-donor nonmetal ions, such as N, O, and S.

The solvent kind and amount may be chosen to achieve a desired viscosity during the deposition process. The conductive agent may require a separate dispersion operation, which would usually be performed by pre-mixing some binder and the conductive agent and then passing the resulting mixture through a dispersing system, such as a ball mill or a high-shear mixer. In certain embodiments, the operation takes hours and the mixture may be periodically tested, e.g., using a Hegman gauge, to determine the presence of un-dispersed, conductive agent particles. In general, the size of the conductive agent particles is between about 10 and 100 μm. It is especially useful if the particle size is no more than about 50% the thickness of the active material layer. If the particles are too large, they may interfere with the slurry deposition process and affect the uniformity of the layer and its electrical properties.

The remaining components may be then added into the slurry. The formulation of the slurry excluding the solvent (i.e. the solid content) at this point is usually representative of the resulting active layer. Typically the viscosity of the slurry is adjusted by adding solvent suitable for use with the deposition system. For many processes, a slurry viscosity of 5,000-40,000 cP is appropriate. When the desired viscosity is reached, the slurry is coated onto the current collector and the solvent is removed by drying, for example, during operation 308. A typical weight density of the dry active layer may be between about 0.001 $g/cm^2$ and 0.030 $g/cm^2$, excluding the substrate.

Coating may be performed using a moving web of current collector. For example, a web of copper, nickel, or stainless steel foil having a thickness of about 10-30 μm and a width of about 10-500 cm may be used. The web may be patch-coated on both sides with the slurry. Each patch can be used later as an electrode in an electrochemical cell. The web can be used a current collector. The uncoated gap between the patches may be used for attachment of battery terminals. Alternatively, a continuous coating may be applied on one or both sides of the web (current collector).

The coated and dried current collectors are usually compressed to achieve a desired density of the electrode layer. The compressing may be done using a set of rollers configured to keep a certain pressure or provide a certain gap. The rollers may be heated to between about 60 and 120 degrees Centigrade. Moreover, the coated current collector may be pre-heated to between about 60 and 120 degrees Centigrade making the active material layer more susceptible to uniform compression. The electrodes may be compacted to a total thickness of between about 50-300 μm, including both active layers and a current collector. Typically, the porosity of the compressed electrode is between about 20 and 50%, more specifically between about 30 and 40%. Finally, the compressed coated current collectors are cut to the desired width and length. Battery terminals may be attached to the current collector either before or after the cutting.

Figure 4:
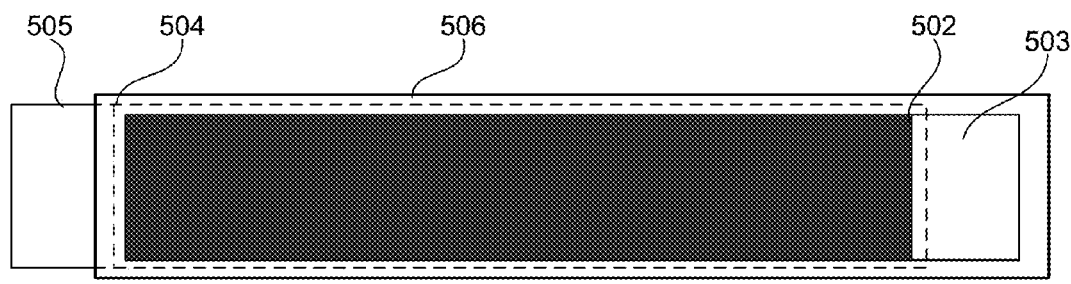
FIG. 4 is a top schematic view of an illustrative electrode arrangement, in accordance with certain embodiments.

FIG. 4 is a plan view of a partially-assembled electrochemical cell that uses electrodes described herein, according to certain embodiments. The cell has a positive electrode active layer 502 that is show covering a major portion of a positive current collector 503. The cell also has a negative electrode active layer 504 that is show covering a major portion of a negative current collector 505. Between the positive electrode active layer 502 and the negative electrode active layer 504 is a separator 506.

In one embodiment, the negative electrode active layer 504 is slightly larger than the positive electrode active layer 502 to ensure trapping of the lithium ions released from the positive electrode active layer 502 by the active material of the negative active layer 504. In one embodiment, the negative active layer 504 extends at least between about 0.25 and 5 mm beyond the positive active layer 502 in one or more directions. In a more specific embodiment, the negative layer extends beyond the positive layer by between about 1 and 2 mm in one or more directions. In certain embodiments, the edges of the separator 506 extend beyond the outer edges of at least the negative active layer 504 to provide complete electronic insulation of the negative electrode from the other battery components.

Figure 5:
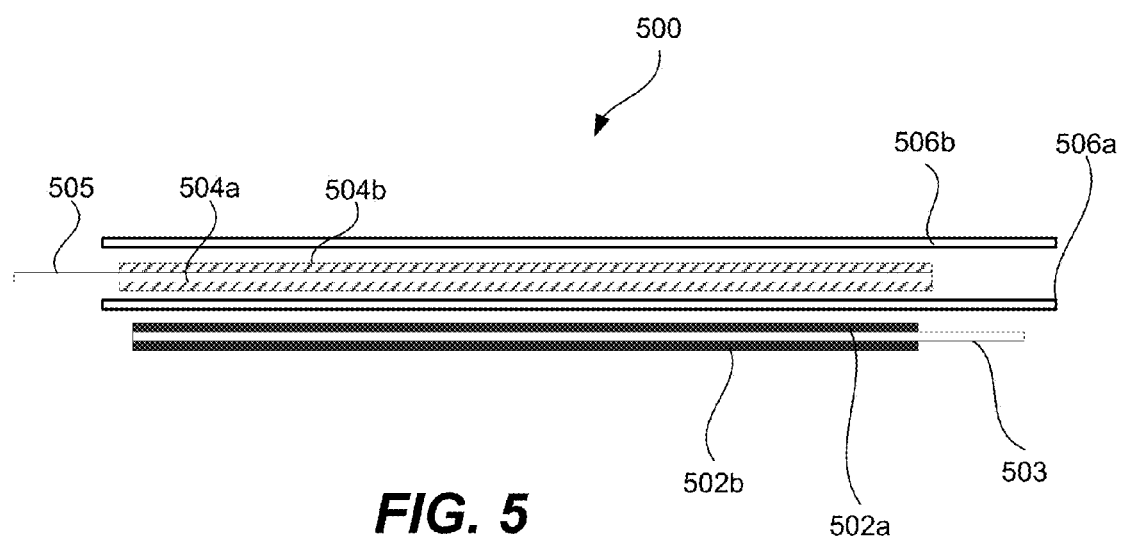
FIG. 5 is a side schematic view of an illustrative electrode arrangement, in accordance with certain embodiments.

FIG. 5 is a cross-section view of an electrode stack 500 of the partially-assembled electrochemical cell that uses electrodes described herein, according to certain embodiments. There is a positive current collector 503 that has a positive electrode active layer 502a on one side and a positive electrode active layer 502b on the opposite side. There is a negative current collector 505 that has a negative electrode active layer 504a on one side and a negative electrode active layer 504b on the opposite side. There is a separator 506a between the positive electrode active layer 502a and the negative electrode active layer 504a. The separator 506 serves to maintain mechanical separation between the positive electrode active layer 502a and the negative electrode active layer 504a and acts as a sponge to soak up liquid electrolyte (not shown) that will be added later. The ends of the current collectors 503, 505 on which there is no active material can be used for connecting to the appropriate terminal of a cell (not shown).

The electrode layers 502a, 504a, the current collectors 503, 505, and the separator 506a together can be said to form one electrochemical cell unit. The complete stack 500 shown in FIG. 5, includes the electrode layers 502b, 504b and the additional separator 506b. The current collectors 503, 505 can be shared between adjacent cells. When such stacks are repeated, the result is a cell or battery with larger capacity than that of a single cell unit.

Figure 6A:
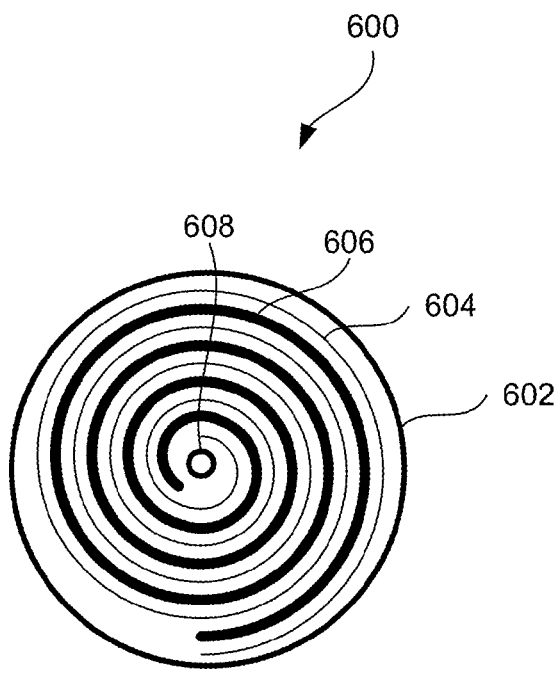
FIGS. 6A-6B are top schematic views and a perspective schematic view of an round wound cell, in accordance with certain embodiments.
Figure 6B:
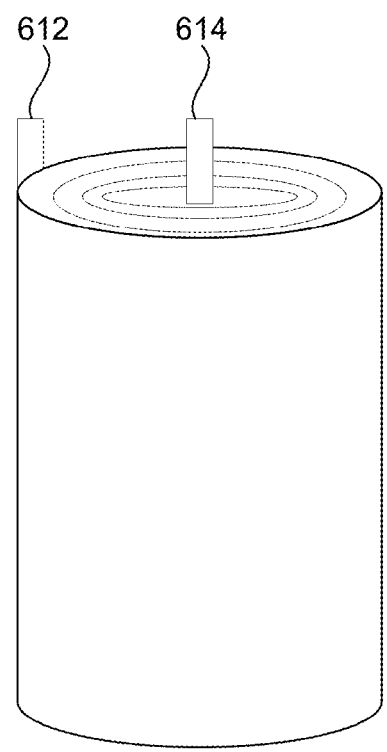

Another way to make a battery or cell with large capacity is to make one very large cell unit and wind it in upon itself to make multiple stacks. The cross-section schematic illustration in FIG. 6A shows how long and narrow electrodes can be wound together with two sheets of separator to form a battery or cell, sometimes referred to as a jellyroll 600. The jellyroll is shaped and sized to fit the internal dimensions of a curved, often cylindrical, case 602. The jellyroll 600 has a positive electrode 606 and a negative electrode 604. The white spaces between the electrodes are the separator sheets. The jelly roll can be inserted into the case 602. In some embodiments, the jellyroll 600 may have a mandrel 608 in the center that establishes an initial winding diameter and prevents the inner winds from occupying the center axial region. The mandrel 608 may be made of conductive material, and, in some embodiments, it may be a part of a cell terminal. FIG. 6B shows a perspective view of the jelly roll 600 with a positive tab 612 and a negative tab 614 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650 cell with 18 mm diameter and 65 mm length may have electrodes that are between about 300 and 1000 mm long. Shorter electrodes corresponding to lower rate/higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets generally should be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 7:
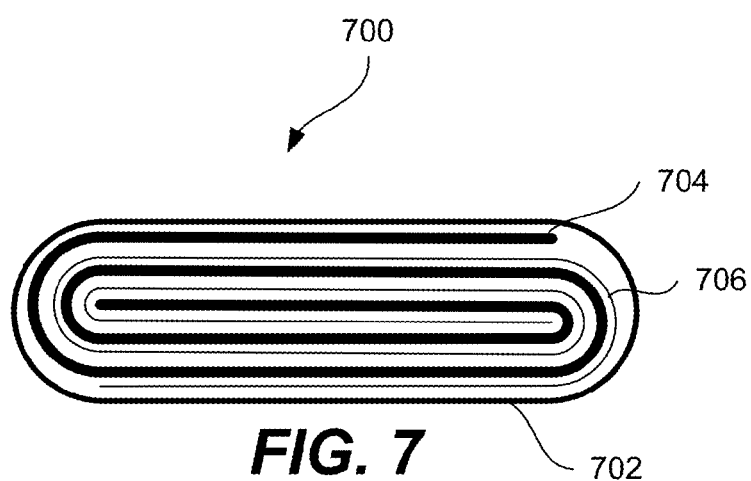
FIG. 7 is a top schematic view of a prismatic wound cell, in accordance with certain embodiments.

FIG. 7 illustrates a top view of a wound prismatic jellyroll 700. The jellyroll 700 includes a positive electrode 704 and a negative electrode 706. The white space between the electrodes is the separator sheet. The jelly roll 700 is enclosed in a rectangular prismatic case 702. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
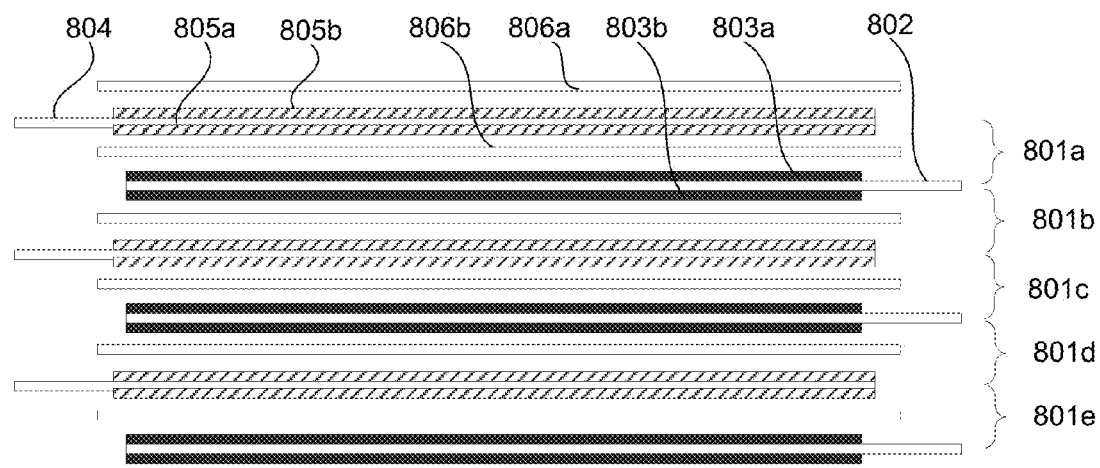
FIGS. 8A-8B are a top schematic view and a perspective schematic view of an electrode stack, in accordance with certain embodiments.
Figure 8B:
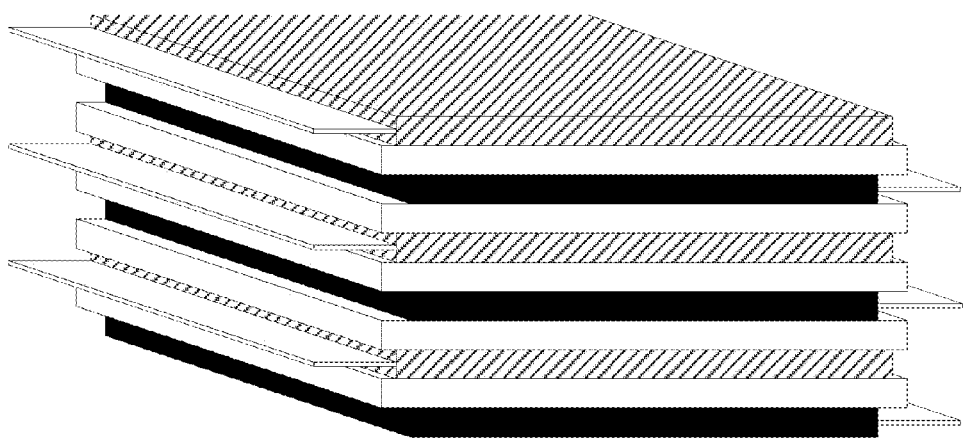

FIG. 8A illustrates a cross-section of a stacked cell that includes a plurality of cells (801a, 801b, 801c, 801d, and 801e), each having a positive electrode (e.g., 803a, 803b), a positive current collector (e.g., 802), a negative electrode (e.g., 805a, 805b), a negative current collector (e.g., 804), and a separator (e.g., 806a, 806b) between the electrodes. Each current collector is shared by adjacent cells. One advantage of stacking cells is that the stack can be made in almost any shape, which is particularly suitable for prismatic batteries. The current collector tabs typically extend from the stack and lead to a battery terminal. FIG. 8B shows a perspective view of a stacked cell that includes a plurality of cells.

Once the electrodes are arranged as described above, the battery is filled with electrolyte. The electrolyte in lithium ions cells may be liquid, solid, or gel. Lithium ion cells with the solid electrolyte are also referred to as a lithium polymer cells.

A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4 LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
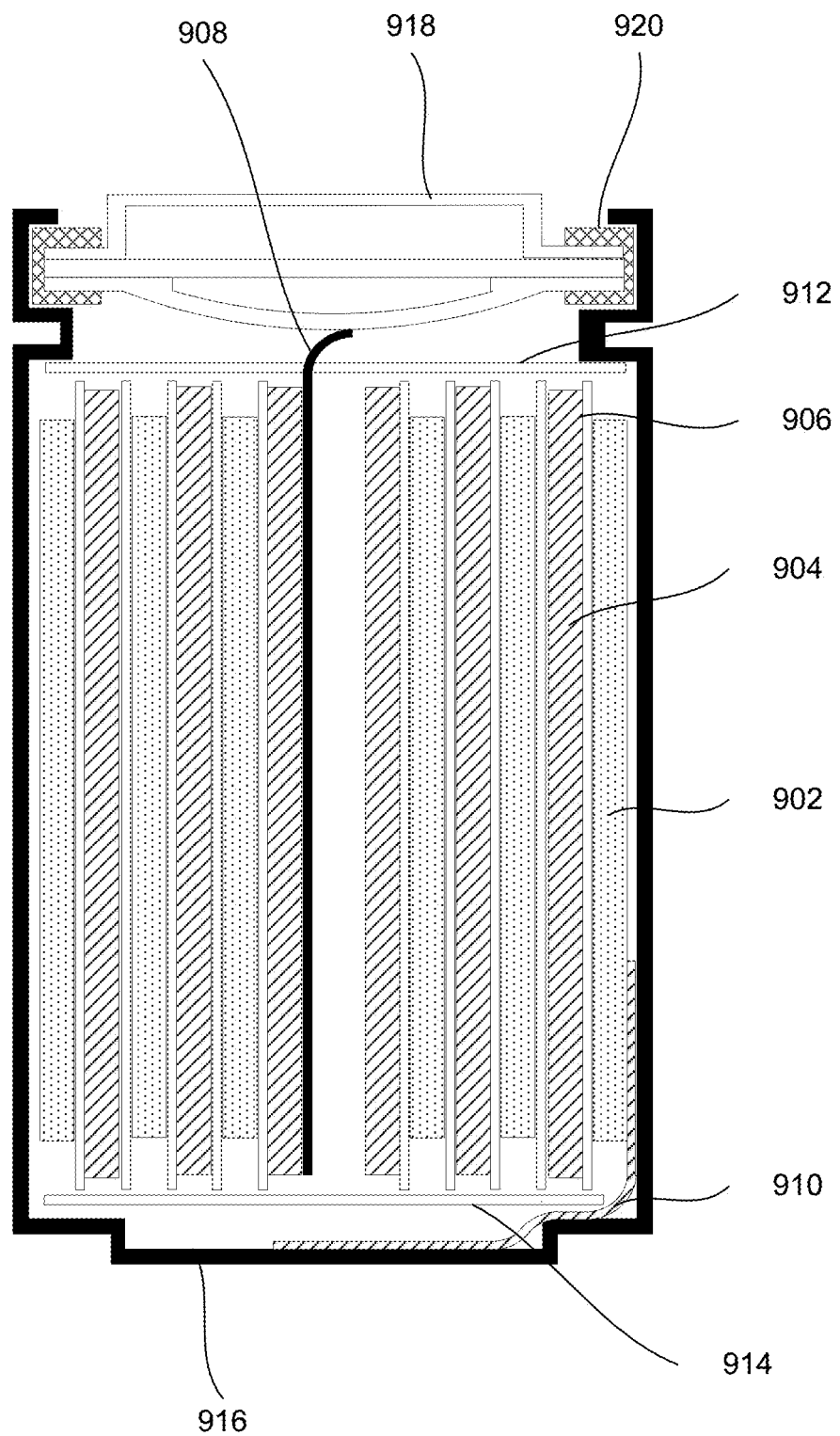
FIG. 9 is a schematic cross-section view of an electrochemical cell, in accordance with embodiments.

FIG. 9 illustrates a cross-section view of the wound cylindrical cell in accordance with one embodiment. A jelly roll includes a spirally wound positive electrode 902, a negative electrode 904, and two sheets of the separator 906. The jelly roll is inserted into a cell case 916, and a cap 918 and gasket 920 are used to seal the cell. In some cases, cap 918 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

A lithium ion battery, which may form or be part of a cell pack or a battery pack, includes one or more lithium ion electrochemical cells, each containing electrochemically active materials. In addition to the cells, a lithium ion battery may also include a power management circuit to control balance power among multiple cells, control charge and discharge parameters, ensure safety (thermal and electrical runaways), and other purposes. Individual cells may be connected in series and/or in parallel with each other to form a battery with appropriate voltage, power, and other characteristics.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of fabricating an electrode for use in a lithium ion cell, the method comprising:
   providing porous base structures comprising a high capacity active material; and
   forming one or more shells over the porous base structures to encapsulate the high capacity active material of the porous base structures, the one or more shells mechanically constrain the porous base structure and allow passage of lithium ions through the one or more shells during lithiation and delithiation of the high capacity active material while substantially preventing one or more electrolyte solvents from interacting with the high capacity active material encapsulated within the one or more shells,
   wherein a porosity of the porous base structure decreases during lithiation of the high capacity active material and increases during delithiation of the high capacity active material; and
   wherein the porous base structures and the shell form composite structures that have forms selected from the group consisting of rods, tubes, and wires with high aspect ratios greater than about 4, and particles.

2. The method of claim 1, further comprising:
   mixing the porous base structures encapsulated in the one or more shells in a binder to form a slurry; and
   coating the slurry onto a conductive substrate.

3. The method of claim 1, wherein forming the one or more shells comprises attaching the porous base structures to a conductive substrate.

4. The method of claim 1, wherein the porous base structures are provided on a conductive substrate.

5. The method of claim 4, wherein a portion of the one or more shells forms a layer over the conductive substrate.

6. The method of claim 1, further comprising, prior to providing the porous base structures, forming the porous base structures by reducing fumed silica at a temperature of less than about 700° C.

7. The method of fabricating the electrode of claim 1, further comprising, prior to providing the porous base structures, forming the porous base structures by etching silicon structures.

8. The method of fabricating the electrode of claim 1, further comprising, prior to providing the porous base structures, forming the porous base structures from metallurgical grade silicon.

9. The method of fabricating the electrode of claim 1, wherein forming the one or more shells comprises chemical vapor deposition of a carbon-containing material on the porous base structures.

10. The method of fabricating the electrode of claim 1, wherein forming the one or more shells comprises carbonizing a polymer precursor.

* * * * *